Sept. 1, 1970 W. C. HELLER, JR 3,526,704

METHOD AND APPARATUS FOR COLOR PRINTING AND THE LIKE

Filed Nov. 9, 1965

INVENTOR.
WILLIAM C. HELLER JR.

BY Denbigh S. Matthews

ATTORNEY 3,526,704

METHOD AND APPARATUS FOR COLOR PRINTING AND THE LIKE

William C. Heller, Jr., 1840 N. Farwell Ave., Milwaukee, Wis. 53202

Filed Nov. 9, 1965, Ser. No. 506,991
Int. Cl. H04n *1/46;* G01d *15/12;* B41m
U.S. Cl. 178—5.2 14 Claims The present invention relates to methods and apparatus for color printing, copying, reproducing and the like.

The disclosure of the specification, claims and drawings of the copending patent application of Alfred F. Leatherman, entitled "Apparatus and Process for Printing" and filed concurrently herewith, Ser. No. 506,960, is incorporated herein and made a part hereof by reference.

Heretofore, a dry method for color reproduction of an original in a single scanning step has not been available. Therefore, it is an object of this invention to provide methods for color printing, transmitting information, copying, reproducing and the like using a composition including finely divided magnetic particles and a color component.

It is another object of this invention to provide apparatus useful for color printing and the like using a composition including finely divided magnetic particles and a color component.

These and other objects and advantages of the present invention will become more apparent to those skilled in the art from the following detailed description and claims taken in conjunction with the accompanying drawings, wherein like components in the various views are generally indicated by like reference marks, in which:

The present invention includes within its scope a method for color printing and the like, preferably in a single scanning step. In the invention herein described, a composition including finely divided magnetic particles and a color component is used as the "ink" and the deposition of the same is controlled by means of magnetic fields. As pointed out in the copending application of Alfred F. Leatherman, supra, individual field sources or type faces can be replaced by a plurality of type faces or probes, and the object to be printed can be scanned. FIGS. 30–43 of said application illustrate the process and apparatus involved.

In the aforesaid copending application of A. F. Leatherman, an original copy is dissected into discrete elements of information concerning specific local areas on the original copy. This information is used to control the reproducing means on a corresponding elemental basis to produce the proper local shade of darkness on the reproduced copy corresponding to the original copy. In one embodiment, an array of photosensitive devices delivers and amplifies electrical signals to an array of electromagnets whose magnetic fields cause magnetic particles to deposit on a reproduced copy in an organized manner. The improvement of the present invention includes within its scope several simultaneous dissecting and reproducing means which act on adjacent or overlapping areas of the original and reproduced copy so as to improve the degree of coverage, resolution, and definition, and permit the use of relatively large elements. The improvement of the present invention can be used to advantage in color reproduction by additionally arranging for the hereinabove described adjacent or overlapping elements to be sensitive to and reproduce different color components in a constructive manner. In this latter embodiment, means are provided to allow each row of a series of rows of photocells to be optically responsive to a different color. Correspondingly, each row in a series of rows of electromagnets is arranged to attract different colored particles from a plurality of particle sources so as to cause the particles to deposit on the reproduced copy in a desired color pattern corresponding to that of the original. As used herein, the term "colors" includes black and white.

Figure 1:
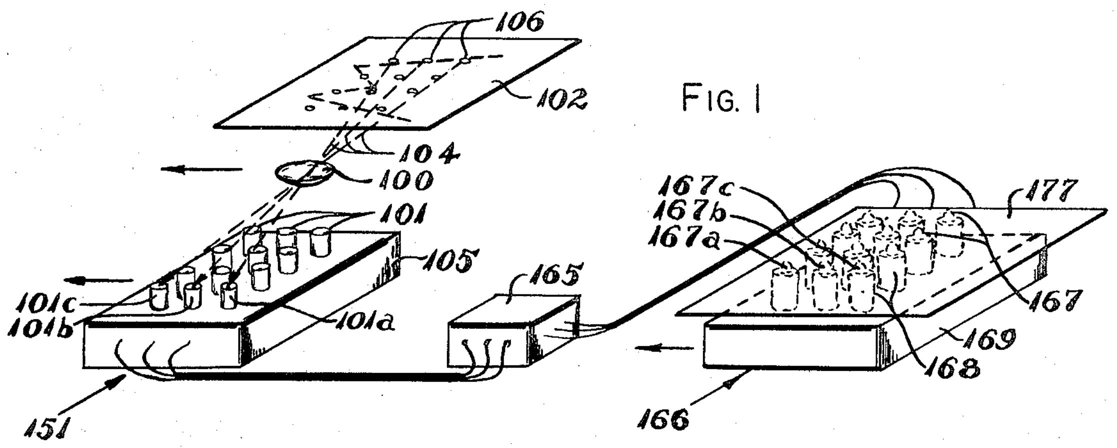
FIG. 1 is a schematic isometric view showing rows of photosensitive devices used in conjunction with a single lens, and rows of magnetizing cores in position to make a reproduction.

Referring to the embodiment of the invention illustrated by FIG. 1, three rows of photosensitive devices 101 "photocells" or "cells" are illustrated with specific photosensitive devices 101*a*, 101*b*, and 101*c* in the foreground. The upper ends of devices 101 contain the responsive areas and these all lie in a focal plane of lens or focusing device 100 which serves to project an optical image of the underside of illuminated original 102 onto the photosensitive areas as known to related art. The three rows of devices 101 and supporting base 105 are referred to as photocell array 151. Array 151 and lens 100 are provided with mechanical means, not shown, to cause them to scan the stationary original 102, in the example shown, in the direction to the left as shown by the arrows. Thus the array is given a unidirectional relative scanning movement with respect to the original. At the instant shown in FIG. 1, three light rays 104 travel from original 102 through lens 100 and illuminate individual cells 101*a*, 101*b*, and 101*c*. Thus, it can be appreciated that each row of cells 101 is sensitive to different zones as shown by circles 106 on original 102. It will be appreciated by those familiar with optics that, with the simple lens shown, the particular photosensitive devices 101*a*, 101*b*, and 101*c* are sensitive to areas at the far edge of original 102, and that in scanning as shown, cell 101*a* is the first to receive a partial optical image of original 102, and cell 101*c* is the last to receive the same.

As disclosed in the hereinabove referenced copending application of A. F. Leatherman, the electrical signals from array 151 are amplified by amplifier 165, and used to control the energization of magnetizing cores 167 by means of coils 168. Array 166 comprising cores 167, coils 168, and supporting base 169 scans a receiving sheet 177 in the direction to the left as shown by the arrow. Magnetic particles, not shown in FIG. 1, are applied to the top region of copy 177, as shown in the copending application to A. F. Leatherman or in subsequent figures of the present application, to achieve the developing of a reproduced magnetically printed copy of original 102.

According to the present invention, cell 101*a* of cell array 151 is connected electrically so as to control the magnetization of core 167*a*. Cell 101*b* controls core 167*b*, and cell 101*c* controls core 167*c*, and so on in like manner for the entire arrays 151 and 166. Cores 167*a*, 167*b*, and 167*c* are shown in the foreground of FIG. 1. To be precise, these cores should be at the far end of the array to make the desired reproduction, and have been shown in the foreground only to clarify the figure notations. In one manner of operation, each row of cells 101 acts in conjunction with a corresponding row of cores 167 to reproduce the copy in a systematic manner so long as the correct spatial equivalence obviously required between cell spacings, row spacings, and core spacings, etc., is maintained.

It will be understood by those skilled in the art that if the light-sensitive areas of photocells 101 are placed sufficiently close to the original, lens 100 could be eliminated.

In making either "black-and-white" or "color" copy, the concept of FIG. 1 can be modified by choice to provide increased efficiencies of resolution and coverage by staggering the individual cells with respect to one another so that no two cells scan exactly the same areas or path regions of the original, and correspondingly, no two cores act to reproduce over again the exact same areas or path regions of the reproduction.

Figure 2:
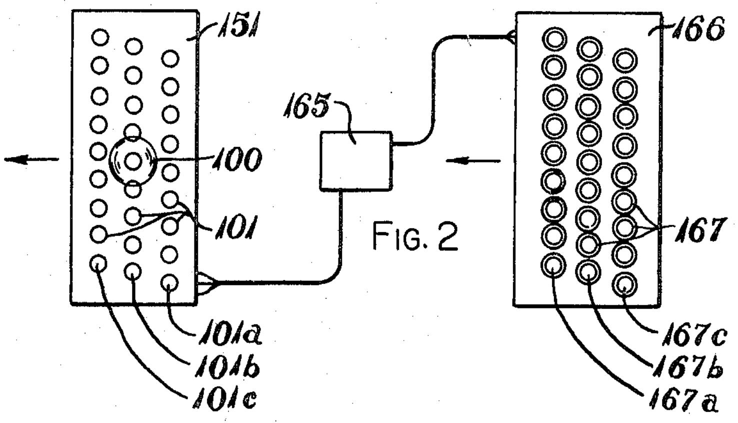
FIG. 2 is a plan view showing a staggered arrangement of the active areas of the photocell and magnetizing arrays.

Referring to FIG. 2, an embodiment of the invention illustrates the staggering concept as it would be used in the lower part of the apparatus of FIG. 1. Original 102 and receiving sheet 177 of FIG. 1 are eliminated from the drawing for purposes of convenience only. Cell array 151 and core array 166 are shown scanning to the left in FIG. 2. Cells 101 have been staggered so that the path scanned by the cells covers the entire area of the original. In a corresponding manner, the paths scanned by cores 167 cover the entire area of the receiving sheet. The concept thus described applies to the arrangement of the entire cell and core arrays. This scheme will be seen to permit the spacing between the elements scanned on original 102 and reproduced on copy 177 to effectively be reduced and brought more closely side-by-side than would be possible with single rows. This permits greater resolution and definition to be obtained for fixed types of cells and cores than would be possible in a single-row plan.

Figure 3:
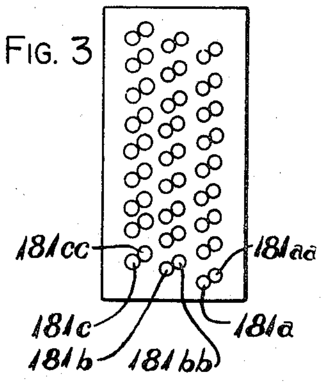
FIG. 3 is a plan view showing pairs of staggered photosensitive devices in an array.

Referring to FIG. 3, a more advanced embodiment of the scheme of FIGS. 1 and 2 is shown wherein each cell and core element consists of pairs of devices. Cells **181*a* and 181*aa* of FIG. 3 correspond to cell 101*a* of FIG. 2. It will be understood that a core array corresponding to the geometry of the cell array of FIG. 3 also exists but is not shown. Additionally, more than two devices can also be employed to correspond to cell 101*a* or core 167*a*** of FIG. 2, so as to achieve even greater resolution and definition.

Figure 4:
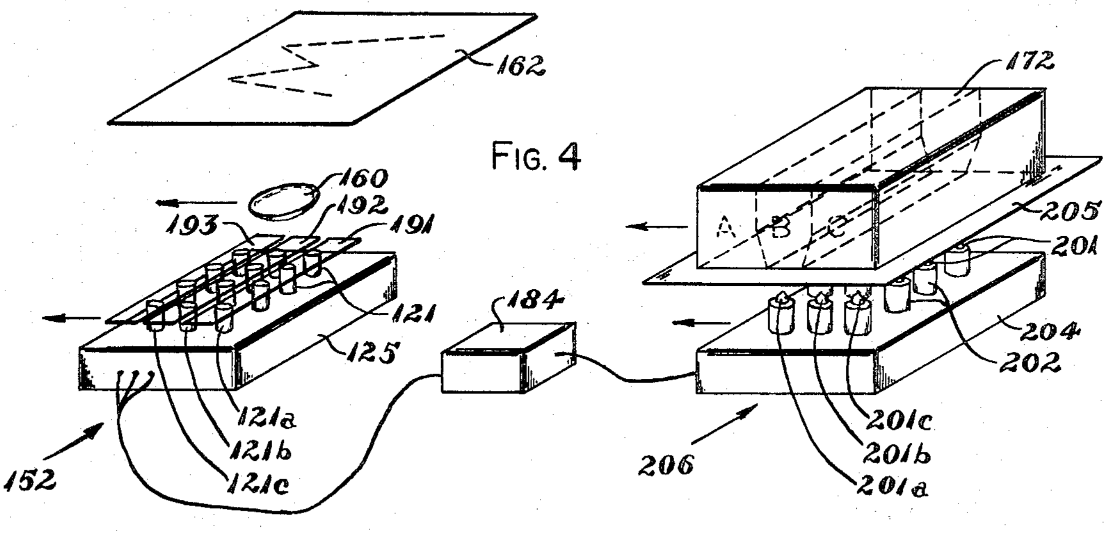
FIG. 4 is an isometric view of an arrangement of apparatus for scanning an original by means of photocells with filters responsive to different colors, amplifying the signals produced, and using the amplified signal for operating a magnetic array for magnetic color printing on copy material.

An embodiment of the invention to produce color-copying or printing is shown in FIG. 4. In the example of FIG. 4, three parallel rows of photocell devices 121 are shown mounted on base 125 in array 152 with lens 160 arranged in the manner previously described for FIG. 1. Optical filters 191, 192, and 193 are interposed between cells 121 and lens 160 so that the light reaching the cells from colored original 162 must pass through them. Filter 191 is disposed to intercept light reaching the row of cells of which cell **121*a* is a member, and filter 192 and filter 193 serve in corresponding manners for the other two rows. Filter 191 passes light of say, color A, filter 192 passes color B, and filter 193 passes color C. Cell array 152 and lens 160 scan to the left as shown by the arrow. The reproducing section of the apparatus is provided with a transport device 172 containing three chambers or particle discharge units A, B, and C. A composition including finely divided magnetic particles and a color component is maintained, for example, as a cloud within each chamber for delivery to the upper surface of receiving material 205. Chamber A supplies particles of color A, Chamber B supplies particles of color B, etc. Array 206 and cloud transport device 172 both scan stationary copy 205 in a direction to the left as shown by the arrows. In this manner, magnetizing core 201*a*, for example, is always located on the lower side of copy 205 but in alignment with particle Chamber A. The cell row containing cell 121*a* responds to light of color A transmitted by filter 191. The electrical outputs of the cells in the row containing cell 121*a* are amplified by amplifier 184 and used to energize the row of cores 201 containing core 201*a*, so as to attract magnetic particles of color A from particle Chamber A. The other rows of cells and cores function in like manner when scanning takes place, so as to generate a multi-color pattern on copy 205, corresponding to the color pattern on original 162. As in the case of FIGS. 1 and 2, the positions of cores 201 in the core array 206** of FIG. 4 have been inverted to aid in clarity of designation in the figure.

It is understood that certain modifications and differences in the optical and electrical operation of the color reproduction system of the present invention can be made in accordance with those shown in the hereinabove referenced copending application of A. F. Leatherman. For example, the intensity of reproduction of a given color can be varied by varying the intensity of the magnetic fields generated by the magnetizing array. Also, electrical signals that cause printing to take place as a series of small dots or line segments may be introduced or superimposed to advantage. In this regard, advantages may be realized from the staggering concept of FIGS. 1, 2, and 3 as incorporated in FIG. 4 to produce colored elements in juxtaposition. This arrangement permits the color white to be printed by using certain color combinations such as primary colors. Further, by varying the intensity of the magnetic fields a measure of control of the effective size and opacity of such elements in juxtaposition can be achieved so as to produce various tones and hues of color.

By suitably adjusting the opacity of the reproduction action, the effect of a translucent layer of color can be realized leading to the use of overprinting techniques since the particles of successive layers of color tend to nestle and mix on the particle-receiving material. Thus combinations of colors and various tones and hues can be reproduced by this method, or white can be printed when appropriate color combinations are selected. When using the technique of overprinting, it may be desirable in some cases not to stagger the cells and cores. In other cases, the cells can be staggered to advantage when the rows contain multiple elements as explained in connection with FIG. 3.

In addition to the use of a color filter for each row of cells as shown in FIG. 4, a desirable alternative is to employ cells which differ in spectral response. In other words, cells responsive to a different color comprise each of the rows so that each row is itself responsive to a different color and color filters are not necessary. In other cases, it may be preferable to employ a separate lens for each row of cells wherein each lens is selectively sensitive to a different color and thus functions also as a filter. More than one lens or filter can be used for each color or row where desirable.

Other advantages may be realized when photosensitive devices are responsive to radiant energy not in the visible portion of the spectrum, such as ultraviolet, infrared, alpha-radiation, or X-ray. In a similar manner, advantages may be realized when the original is illuminated by direct light, reflected light, or other radiant energy such as ultraviolet or microwaves.

The apparatus of FIG. 4 is used to make dry color copies of an original "instantly" in a single-scan process, and, when permanent marking is obtained, without heat or special papers. When permanent marking is not obtained, it is understood that means for fixing the resultant copy including those of hereinabove copending application of A. F. Leatherman can be incorporated into the apparatus of FIG. 4.

In accordance with the copending application of A. F. Leatherman, particle-receiving means 205 of FIG. 4, for example, may consist of a continuous web of paper fed from a roll and automatically cut to desired length. Furthermore, in some cases such as when many copies of a certain original are desired, the optical signals can be recorded in a memory such as a tape recording and used to provide inputs to amplifier 184. Also, the optical signals could be converted to radio broadcasts in which the original may be, for example, in one city and the copies prepared in another city, or wire communication instead of radio could be used.

The method of the present invention has been shown to be useful in the magnetic color printing, copying, and the like on paper, fabric, textiles, plastics and other flat or elongated objects. It also is useful in printing on round objects or objects having irregular shapes such as milk bottles, beverage bottles, cartons, detergent bottles and the like. The apparatus and methods shown herein can be modified for such purposes by using some of the apparatus such as the flexible carriers of the copending application of Alfred F. Leatherman, supra. Also, the carrier, circuits, arrays, magnet or core, magnetic particles, films, binders, resins, color pigments and so forth can be like those of said copending application.

The carrier or type face can be cleaned by one or more of the methods shown in the copending application of Alfred F. Leatherman, supra. Likewise, excess magnetic particles can be removed by one or more of the methods shown in said application as well as by applying hot air to the collected particles so that the outermost ones will be heated above the Curie temperature, causing them to be released, and removing the heat when the optimum condition has been reached.

In regard to materials, by using one or more of the various binders discussed in the copending application, including polyethylene, polyvinyl chloride, polyvinyl chloride-vinyl acetate copolymers, polyacrylates, phenol or resorcinol-aldehyde resins, polyesters, acrylonitrile-butadiene-styrene copolymers, vinylidene chloride polymers, polypropylene, polystyrene, cellulosic polymers, polyurethane and other thermoplastic or thermosetting materials, and a pigment, the colored magnetic particles are made. Still other thermoadhesive polymers or resins can be used as binders such as rosin, gum, copal, "Vinsol," Egyptian asphalt, hydrocarbon resins and the like. The binder can be dissolved in solvent, mixed with the pigment and magnetic particles and spray dried. In another method the ingredients are mixed, preferably hot, then cooled and micropulverized. Where the binder, magnetic particles and pigment exhibit the triboelectric effect, simple mixing can be sufficient to properly coat the magnetic particles with pigment and binder particles. Conventional compounding ingredients can be mixed with the resins or during preparation of the colored particles as desired such as antidegradants, stabilizers, plasticizer if desired, and curing agents if necessary, and so forth. Only sufficient binder is used to combine the pigment and magnetic particles. Greater amounts can be used if desired. Generally, the binder can be used in an amount of from about 10 to 75 parts per 100 parts by weight total of pigment and magnetic particles. The completed pigment-binder-magnetic particle can have an average particle size of from about 0.01 to 100 microns or larger, wherein the latter may be an effective particle size of several particles agglomerated to one another. The color pigment is used in amounts sufficient to obtain the desired color and mask the color of the magnetic particles if dark or black. Large excesses should not be used as such may interfere with cloud and magnetic pattern formation. The pigment particles can be of the same size as the magnetic particles but preferably are smaller in order to coat or substantially coat the magnetic particles. Various color pigments can be used including carbon black, ultramarine blue, chrome oxide, cadmium orange, molybdate orange, cadmium reds, Cd-Hg sulfide reds, Coal violets, calcium carbonate, titanium dioxide, zinc sulfide, phthalocyanine blues, phthalocyanine greens, Amaplast orange LF, the Monastral Reds, the Benzidine and Amaplast yellows and so forth. Still other pigments can be used as shown in "Materials and Compounding Ingredients for Rubber and Plastics," 1965, Rubber World, New York, N.Y.

The above embodiments are intended to be illustrative of the applicant's process but are not intended to be limiting thereof. Many additional applications and combinations will be immediately obvious to those skilled in the art. Although the method of FIG. 4 produces a color copy in one scan, the combined features of FIG. 4 can perform as satisfactorily in a divided or sequential process, the elements of which are indicated hereiin and in FIG. 4. For example, the object to be copied can be scanned more than one time using different colored particles for each scan.

It will be apparent that new and useful methods and apparatus for color printing and the like have been described. Although several preferred embodiments of the invention have been described, it is apparent that modifications may be made therein by those skilled in the art. Such modifications may be made without departing from the spirit or scope of the invention, as set forth in the appended claims.

What is claimed is:

1. A photo detection apparatus for producing a scanning pattern of electrical signals from an image that is to be reproduced comprising means providing an array having a plurality of sets of individual photosensitive elements wherein the photosensitive elements of each set are disposed in predetermined staggered relationship to the photosensitive elements of any other set, means for creating uni-directional relative scanning movement between said array and said image so that the elements of the first of said sets scan a first set of path regions extending the full length of said image each to produce an electrical signal scanning pattern representative thereof and so that the elements of each successive set scan a separate set of path regions extending the full length of said image and disposed at least partly between the previously scanned path regions each to produce an electrical signal scanning pattern, said sets of elements being sufficient to cumulatively scan the entire image region.

2. A photodetection apparatus in accordance with claim 1 wherein the predetermined staggered spacing of the photosensitive elements of said array is such that the path regions scanned by the different sets partly overlap.

3. The apparatus of claim 1 wherein each of said sets is selectively sensitive to a different predetermined spectrum of radiant energy.

4. The apparatus of claim 3 wherein the individual photosensitive elements of each set of said photosensitive elements in said photosensitive array are in themselves responsive to a different spectrum of radiant energy, said individual photosensitive elements of each of said sets being responsive to the same spectrum of radiant energy as other members of the same set but being responsive to a different spectrum of radiant energy then members of other sets.

5. The apparatus of claim 3 wherein a filter is provided for each set.

6. The apparatus of claim 5 wherein each of said filters also serves as a focusing device.

7. An apparatus for magnetic printing and the like comprising an optical array having a plurality of rows of individual photosensitive elements wherein the photosensitive elements of each row are in predetermined staggered relationship to the photosensitive elements of any other row, means for creating uni-directional relative scanning movement between said array and an image to be copied so that the elements of the first of said rows scan a first set of path regions extending the full length of said image each to produce an electrical signal scanning pattern representative thereof and so that the elements of each successive row scan a separate set of path regions extending the full length of said image and disposed at least partly between the previously scanned path regions each to produce an electrical signal scanning pattern, said rows of elements being sufficient to cumulatively scan the entire image region, a corresponding magnetic array having a plurality of rows of magnetic field poles, means for synchronizing relative scanning movement between said magnetic array and said recording medium with the image scanning movement and means for electrically coupling a signal from each of said photosensitive elements to a corresponding field pole for controlling deposit of an image pattern along the scan region of each field pole to collectively produce a corresponding visible image on said recording medium.

8. An apparatus in accordance with claim 7 wherein the spacing of the photosensitive elements in the optical array and the corresponding spacing of the field poles in the magnetic array is such that the path regions scanned by the different rows partly overlap.

9. An apparatus in accordance with claim 7 wherein each of said rows of photosensitive elements is selectively sensitive to a predetermined spectrum of radiant energy, means for providing a distinctive color composition including finely divided magnetic particles for controlled deposit by each separate row of field poles.

10. An apparatus in accordance with claim 9 wherein the individual photosensitive elements of each row of said photosensitive elements in said photosensitive array are in themselves responsive to a different spectrum of radiant energy, said individual photosensitive elements of each of said rows being responsive to the same spectrum of radiant energy as other members of the same row but being responsive to a different spectrum of radiant energy than members of other rows.

11. An apparatus in accordance with claim 7 wherein said coupling means comprises means for amplifying the signal from each photosensitive element.

12. In a photoreproducing method for scanning an image medium and a recording medium in relative synchronism to produce an image on the recording medium corresponding to an image on the image medium by generating electrical signals characteristic of the scanned region of the image and controlling deposit of an image pattern along corresponding scanned regions of the recording medium in accordance with the electrical signals, an improved method comprising correspondingly scanning said mediums in a synchronized multi-pass staggered scan sequence characterized by unidirectional relative scanning movement and further characterized in that a first set of path regions is scanned in parallel spaced apart relation on each medium and each successive set of path regions is scanned in a parallel spaced apart relation on each medium to be disposed at least partly between previously scanned path regions and cumulatively span the entirety of the regions to be scanned on each medium and thereby improve the coverage and resolution of the scanning relative to the size of the individual scanning paths.

13. The method of claim 12 wherein the path regions of the different sets partly overlap.

14. The method of claim 12 and including amplifying the electrical signal from each scanning path region of the image medium, applying an amplified signal to produce an individual magnetic field along each corresponding path region of the recording medium and distributing finely divided magnetic particles in the vicinity of the recording medium for controlled deposit of the particles on the recording medium in accordance with said magnetic fields.

References Cited

UNITED STATES PATENTS

| | | | |
|---|---|---|---|
| 2,294,643 | 9/1942 | Wurzburg. | |
| 2,473,729 | 6/1949 | Salz. | |
| 3,301,948 | 1/1967 | Todt. | |
| 2,951,894 | 9/1960 | Hirsch | 346—140 |
| 3,121,138 | 2/1964 | Murphy. | |

ROBERT L. GRIFFIN, Examiner

D. E. STOUT, Assistant Examiner

U.S. Cl. X.R.

178—6.6; 346—74; 101—426